United States Patent
Haselden et al.

(10) Patent No.: US 8,103,684 B2
(45) Date of Patent: *Jan. 24, 2012

(54) ABSTRACT PIPELINE COMPONENT CONNECTION

(75) Inventors: J. Kirk Haselden, Sammamish, WA (US); Matthew E. David, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/855,112

(22) Filed: Aug. 12, 2010

(65) Prior Publication Data
US 2010/0306208 A1    Dec. 2, 2010

Related U.S. Application Data

(63) Continuation of application No. 11/330,842, filed on Jan. 12, 2006, now Pat. No. 7,779,017.

(51) Int. Cl.
*G06F 17/00* (2006.01)
(52) U.S. Cl. .................................. 707/756; 707/803
(58) Field of Classification Search .................. 707/756, 707/803
See application file for complete search history.

(56) References Cited

U.S. PATENT DOCUMENTS

| | | | |
|---|---|---|---|
| 6,003,039 A | 12/1999 | Barry |
| 6,008,717 A | 12/1999 | Reed |
| 6,195,662 B1 | 2/2001 | Ellis |
| 6,240,416 B1 | 5/2001 | Immon |
| 6,260,043 B1 | 7/2001 | Puri |
| 6,385,606 B2 | 5/2002 | Inohara |
| 6,449,619 B1 | 9/2002 | Colliat |
| 6,477,580 B1 | 11/2002 | Bowman-Amuah |
| 6,523,172 B1 | 2/2003 | Martinez-Guerra |
| 6,529,909 B1 | 3/2003 | Bowman-Amuah |
| 6,549,918 B1 | 4/2003 | Probert |
| 6,611,838 B1 | 8/2003 | Ignat |
| 6,615,252 B1 | 9/2003 | Oka |
| 6,678,700 B1 | 1/2004 | Moore |
| 7,099,350 B2 | 8/2006 | Peterson |
| 7,120,636 B2 | 10/2006 | Pendleton |
| 7,165,216 B2 | 1/2007 | Chidlovskii |
| 7,231,460 B2 | 6/2007 | Sullivan |
| 7,350,191 B1 | 3/2008 | Kompella |
| 7,366,717 B2 | 4/2008 | Warshavsky |
| 2001/0002470 A1 | 5/2001 | Inohara |
| 2003/0130999 A1 | 7/2003 | Probert |
| 2003/0172347 A1 | 9/2003 | Gunn |
| 2003/0233376 A1 | 12/2003 | Bussler |
| 2004/0015515 A1 | 1/2004 | Beisiegel |
| 2004/0139076 A1 | 7/2004 | Pendleton |
| 2004/0189707 A1 | 9/2004 | Moore |
| 2004/0205552 A1 | 10/2004 | Vosburgh |

(Continued)

OTHER PUBLICATIONS

Mon-Fong Jiang; Shian-Shyong Tseng; Shan-Yi Liao, Data Types Generalization for Data Mining Algorithms, Oct. 1999 IEEE.

Wing, J.M.; Ockerbloom, J.; Resectful Type Converters, Jul. 2000 IEEE.

U.S. Appl. No. 11/330,842, mailing date Feb. 21, 2008, Office Action.

(Continued)

*Primary Examiner* — Charles Rones
*Assistant Examiner* — Kurt Mueller
(74) *Attorney, Agent, or Firm* — Workman Nydegger (57) ABSTRACT

The subject disclosure pertains to systems and methods for connecting pipeline components such as data flow pipeline components. Pipeline components are wrapped in metadata components that include the component as well as abstracted metadata in the form of input and output metadata descriptors. A connector can arbitrate metadata differences between pipeline components based on the metadata descriptors, thereby preventing upstream modifications from invalidating or breaking components downstream. Native or plug-in heuristic and/or related components can provide the functionality necessary to resolve metadata differences.

18 Claims, 11 Drawing Sheets

U.S. PATENT DOCUMENTS

| | | |
|---|---|---|
| 2004/0208480 A1 | 10/2004 | Yoon |
| 2005/0055380 A1 | 3/2005 | Thompson |
| 2005/0216501 A1 | 9/2005 | Cengiz |
| 2005/0223047 A1 | 10/2005 | Shah |
| 2006/0106856 A1 | 5/2006 | Bermender |
| 2006/0253540 A1 | 11/2006 | Hughes |
| 2009/0024561 A1 | 1/2009 | Palanisamy |

OTHER PUBLICATIONS

U.S. Appl. No. 11/330,842, mailing date Sep. 8, 2008, Office Action.
U.S. Appl. No. 11/330,842, mailing date Mar. 19, 2009, Office Action.
U.S. Appl. No. 11/330,842, mailing date Dec. 11, 2009, Office Action.
U.S. Appl. No. 11/330,842, mailing date May 10, 2010, Notice of Allowance.

ABSTRACT PIPELINE COMPONENT CONNECTION

CROSS REFERENCE TO RELATED APPLICATIONS

This application is a continuation of application Ser. No. 11/330,842, filed Jan. 12, 2006, and entitled "ABSTRACT PIPELINE COMPONENT CONNECTION." The foregoing is incorporated herein by reference in its entirety.

BACKGROUND

Data integration technologies facilitate providing and managing meaningful information to obtain a competitive business advantage, for example by harnessing historical data to aid future decisions. At the core, integration technologies are systems and methods to extract, transform, and load (ETL) data. Data can be provided from myriad sources including enterprise resource planning (ERP) and customer relation management (CRM) applications as well as flat files, and spreadsheets, among others. Extraction mechanisms can retrieve data from several different sources. After data is extracted, it can be transformed into a consistent format associated with a target repository. Some data may only need to be reformatted during the transformation process. However, other data may need to be cleansed for instance of duplicates. Subsequently, data can be loaded into a data warehouse, data mart or the like where the data can be mined and otherwise analyzed to retrieve beneficial information.

More than half of an extract, transform and load process typically needs to be custom programmed for an organization. In one conventional implementation, packages are central to such a program and represent a unit of work that can be independently retrieved, executed and/or saved. Furthermore, the package serves as a container for all other elements broadly characterized as control flow or data flow.

Control flow elements dictate processing sequence in a package and can include one or more containers to define package structure, tasks that define package functionality or work and precedent constraints that link executables, containers and tasks and specify the order of execution of the linked objects. Control flow elements prepare or copy data, interact with other processes or implement repeating workflow.

Data flow elements including source adapters, transformations and destination adapters, as the name suggests, define the flow of data in a package that extracts, transforms and loads data. Source adapters make data available to a data flow. Transformations perform modifications to data such as aggregation (average, sum), merging (of multiple input data sets), distribution (to different outputs) and data type conversion. Destination adapters load output of the data flow into target repositories such as flat files, databases, or memory.

A data flow pipeline employs multiple elements or components tied together via collections of metadata. A data flow pipeline or diagram thereof can include components and paths that define how the data moves through or with respect to a task. For example, if a task corresponds to reading a text file that has rows and columns of information for an employee, there could be a file full of row information such as first name, last name, social security number, and the like. Here, each column has metadata associated with it such as name is a string and age is a number, for example. This metadata is important to the data flow because it tells an engine that is moving the data and components that are acting on the data what types of operations can be performed successfully on that data. As per the aforementioned example, it is appreciated that different operations can be executed on numbers and strings. If the metadata changes then actions down stream will break. For instance, assume one starts with a column age that is a number and down stream a component uses the age to compute an average age. If the column data is amended subsequently to be a string, the data flow will break, as the average operation cannot compute the average of a string. To remedy this situation a user will conventionally fix the components manually to account for the metadata change.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described the subject innovation pertains to pipeline components and connections amongst such components. According to an aspect of the innovation, conventional pipeline components are isolated from a pipeline by wrapping them in a metadata component. Each metadata component can then include two metadata descriptor components one for input and for output. Hence, metadata is abstracted or withdrawn from pipeline components and made available.

In accordance with another aspect of the subject innovation, a connector component is disclosed that can reside between metadata components. The connector provides a link between metadata components. Moreover, the connector can serve as an arbitrating element utilizing metadata descriptors, for instance when upstream metadata changes.

In accordance with yet another aspect of the subject innovation, the connector component can employ various heuristics or heuristic components for resolving mismatches in metadata caused by upstream changes. For example, heuristics including pass through, connect like names, connect like types, and connect like names and types can be applied with respect to metadata descriptors to attempt to reconnect or arbitrate differences.

According to still another aspect of the subject innovation, extensibility is supported. In particular, systems and methods are provided to facilitate design and customization of heuristic and/or related components. Additionally or alternatively, the subject innovation can support and consume plug-in or third party heuristics and/or related components.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or portion thereof in any manner. It is to be appreciated that a myriad of additional or alternate examples could have been presented, but have been omitted for purposes of brevity.

It should be noted that use of the word "pipeline" or variations in form thereof is not necessarily limited to a serial approach. The term is meant to broadly refer to any dataflow arrangement, unless otherwise noted.

Artificial intelligence based systems (e.g., explicitly and/or implicitly trained classifiers) can be employed in connection with performing inference and/or probabilistic determinations and/or statistical-based determinations as in accordance with one or more aspects of the subject innovation as described hereinafter. As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus, or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device, carrier, or media.

For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 1:
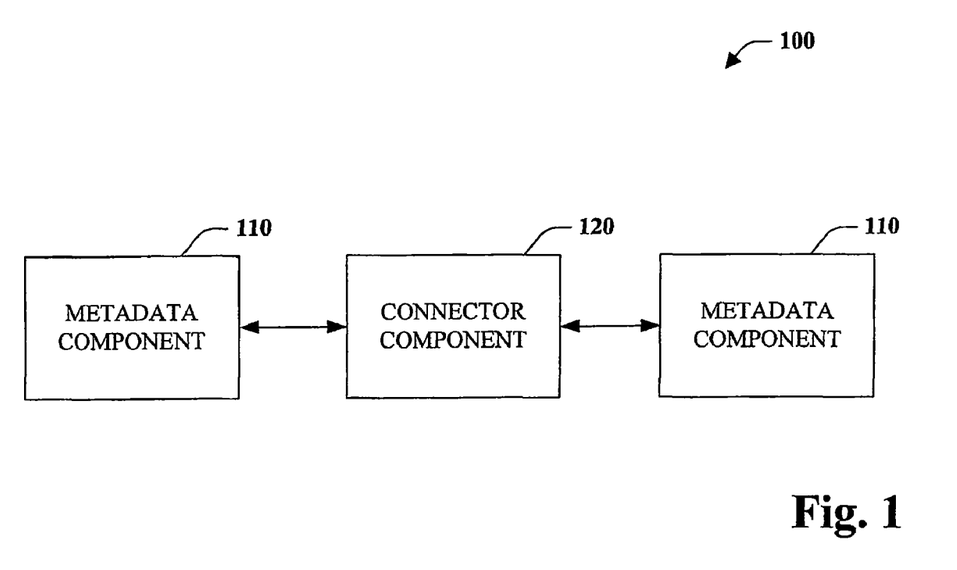
FIG. 1 is a block diagram of a pipeline system.

Turning initially to FIG. 1, a pipeline system 100 is illustrated in accordance with an aspect of the subject innovation. The pipeline system 100 can be but is not limited to a data flow pipeline system for moving data from a source to a destination and manipulating data along the way. The system 100 includes at least two metadata components 110 and a connector component 120. The metadata components 110 are special pipeline components such as data flow components including but not limited to source adapters, transformations, and destination adapters. The connector component 120 connects or links metadata components 110 together. In other words, connector component 120 facilitates communication between metadata components 110. Additionally, connector component 120 can arbitrate metadata differences between metadata components. Data types, forms or other metadata can be manipulated into other metadata on the fly without user intervention. Accordingly, metadata can be altered in such a way that changes to one component up stream will not cause a break with respect to down stream components. The change is effectively hidden from down stream components.

By way of example and not limitation, consider a data flow where columns have metadata last name, first name, and age. Subsequently, there is a change in the upstream data, for example, a different table is employed that has the same types of fields, but in a different order such as age, first name and last name. Conventionally, everything downstream would break because the components 110 expect first name, a string, initially but instead receive age, an integer. There is a metadata disconnect. In this instance, the connector component 120 could simply find like names. There is an age in the new metadata and an age in the old metadata; it is simply in a different position. Accordingly, the connector component 120 can automatically alter the positional location so that it looks to the components down stream as if nothing happened upstream. More specifically, data would be transmitted as last name, first name and age.

Figure 2:
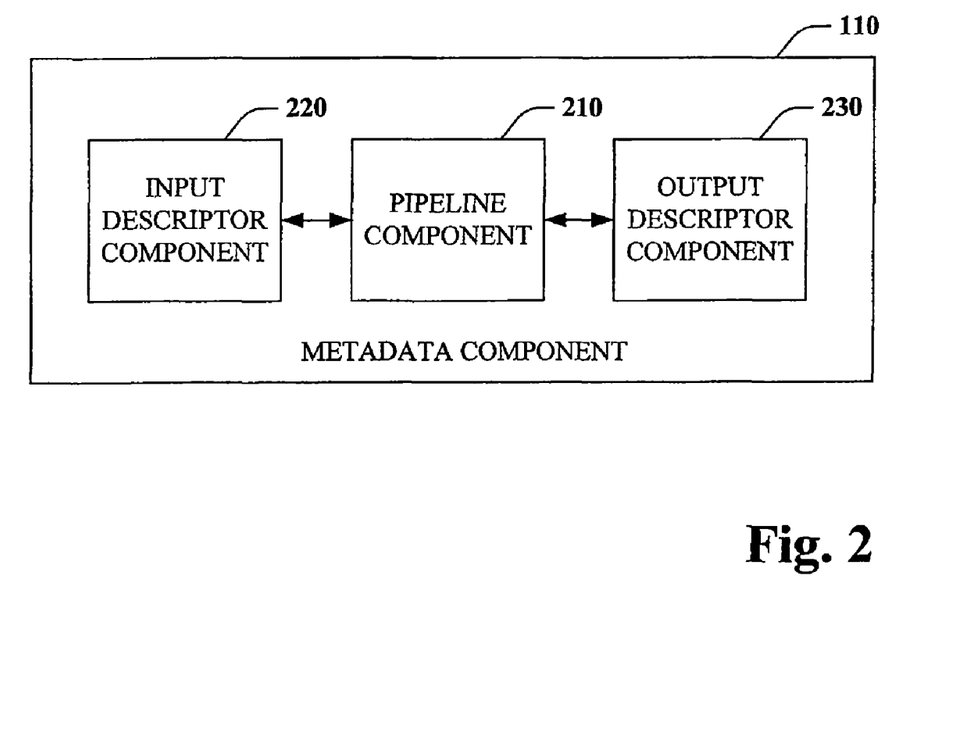
FIG. 2 is a block diagram of a metadata component.

FIG. 2 illustrates a metadata component 110 in accordance with an aspect of the innovation. The metadata component 110 includes a pipeline component 210, an input descriptor component 220 an output descriptor component 230. Pipeline component 210 provides functionality associated with a task, including but not limited to a data integration task. For example, pipeline component 210 can represent a conventional data flow task pertaining to extracting, transforming and/or loading data. Unlike conventional tasks, metadata component 110 includes input and output descriptor components 220 and 230, respectively. The input descriptor component 220 specifies the metadata that the pipeline component 210 expects to receive and can therefore successfully operate. Output descriptor component 230 identifies the metadata associated with the output of the policy component 210. Furthermore, as with other data the metadata provided by the descriptor components 220 and 230 can be cached for expeditious access and to prevent external changes from affecting the pipeline component 210.

Metadata conventionally and solely the concern and responsibility of the policy component 210 is abstracted out or externalized. Stated differently, the pipeline component 220 is wrapped with metadata 220 and 230 to form metadata component 110. These pipeline components 110 are somewhat isolated from other components as there is a layer of abstraction between pipeline components 110. As opposed to the present convention, where the past defines metadata flow, now there is an abstraction such that metadata that is presented to a pipeline component 110 is not necessarily the metadata of the previous component. The pipeline component 110 only sees a specific look of the metadata that it requires.

Figure 3:
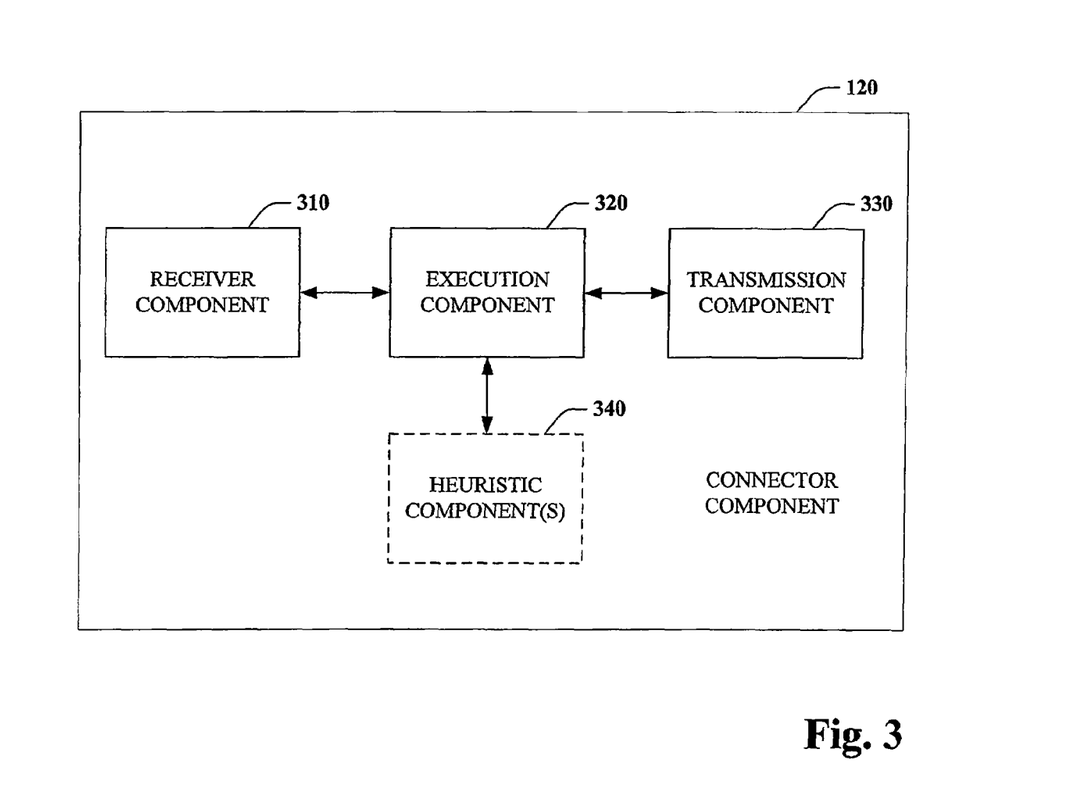
FIG. 3 is a block diagram of a connector component.

FIG. 3 depicts a connector component 120 in accordance with an aspect of the subject innovation. As previously mentioned, the connector component 120 not only links or communicatively couples two or more metadata components 110 (FIGS. 1 and 2), but it can also arbitrate metadata differences or mismatches to prevent down stream breaks. The connector component 120 can include a receiver component 310 communicatively coupled to an execution component 320 communicatively coupled to a transmission component 330.

The receiver component 310 receives, retrieves, or otherwise obtains or acquires data and metadata from one or more metadata components 110. More specifically, the receiver component 110 can acquire metadata from the output descriptor 230 associated with a particular upstream metadata component and the input descriptor 210 related to a linked downstream metadata component. The receiver component 310 can provide obtained data and metadata to execution component 320 for processing.

Execution component 320 is communicatively coupled to one or more heuristic components 340 contained within or external to the execution component 320. A heuristic component 340 provides information and/or functionality that dictates how metadata mismatches are to be resolved. Execution component 320 can interact with the one or more heuristic components 340 to receive and execute the functionality provided thereby in conjunction with the obtained data and metadata. Metadata upstream can be completely different from metadata downstream, yet the connector component 120 can manipulate it so that it looks the same and meets the requirements of metadata component. By way of example and not limitation, a data type can be changed from a string to an integer or XML (eXtensible Markup Language) can be converted to binary, columner of flat file format. The execution component 320 can provide arbitrated data concurrently or subsequently to the transmission component 330 for transmission to a downstream component.

Figure 4:
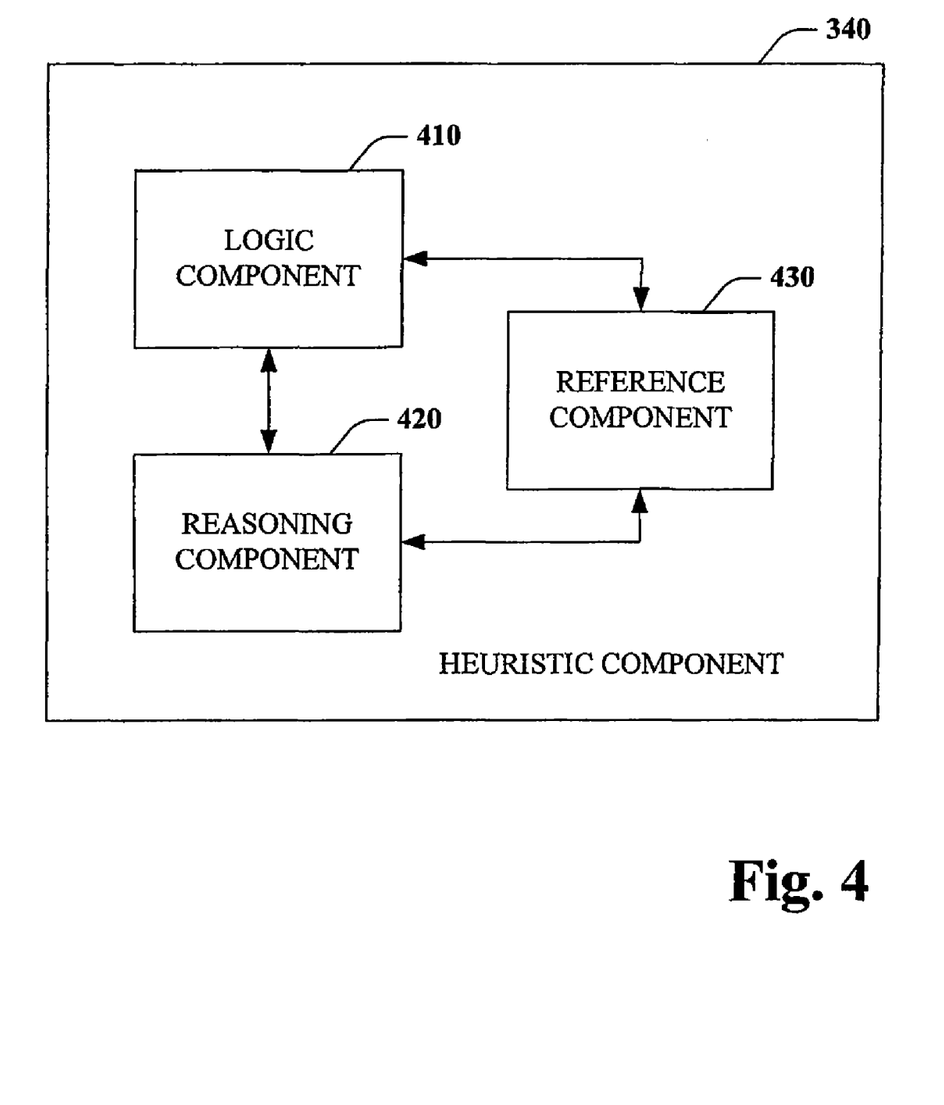
FIG. 4 is a block diagram of a heuristic component.

Turning to FIG. 4 a heuristic component 340 is illustrated in accordance with an aspect of the innovation. The heuristic component 340 can include logic component 410 and reasoning component 420. Logic component 410 provides set logic or algorithms for arbitrating metadata mismatches. For example, logic component can execute heuristics that allow pass through (i.e., direct mapping), connection of like names, connection of like types, and connection of like names and types. By way of example, a connection of like names heuristic may indicate that data indicated as last name, family name, or surname is the same. Accordingly, metadata-describing data such as a last name in one component could be mapped to surname metadata in a downstream component. Similarly, if age is of type string with respect to an upstream component but represented as an integer in a downstream component, the heuristic could perform a conversion from string to integer.

More advanced techniques can be provided by the reasoning component 420. The reasoning component 420 can reason or infer (as that term is described herein) for instance utilizing artificial intelligence, knowledge based systems, machine learning and the like. Accordingly, a heuristic component 340 via the reasoning component 420 can analyze metadata (e.g., provided by descriptors) associated with a source and a target and automatically resolve any differences. In essence, the heuristic component 340 can detect the kind of data being provided on one side or upstream and the kind of data required on another side or downstream and determine an algorithm to appropriately map data or call or import an appropriate heuristic or other data to transform the data.

The heuristic component 340 can also include a reference component 430 communicatively coupled to either or both of the logic component 410 and the reasoning component 420. The reference component 430 can retrieve, receive or otherwise acquire or identify reference data and provide or make available such data to either or both of components 410 and 420. Reference data can be any data or information that is useful in resolving metadata differences. By way of example and not limitation, the reference data could correspond to a mapping or schema for a particular domain. The heuristic component 340 could point to or reference such a schema and make use of such data in arbitrating metadata differences. For instance, if the heuristic component detects that data needs to be transformed from a flat file format to XML, an XML schema can be referenced and employed to facilitate such translation.

Figure 5:
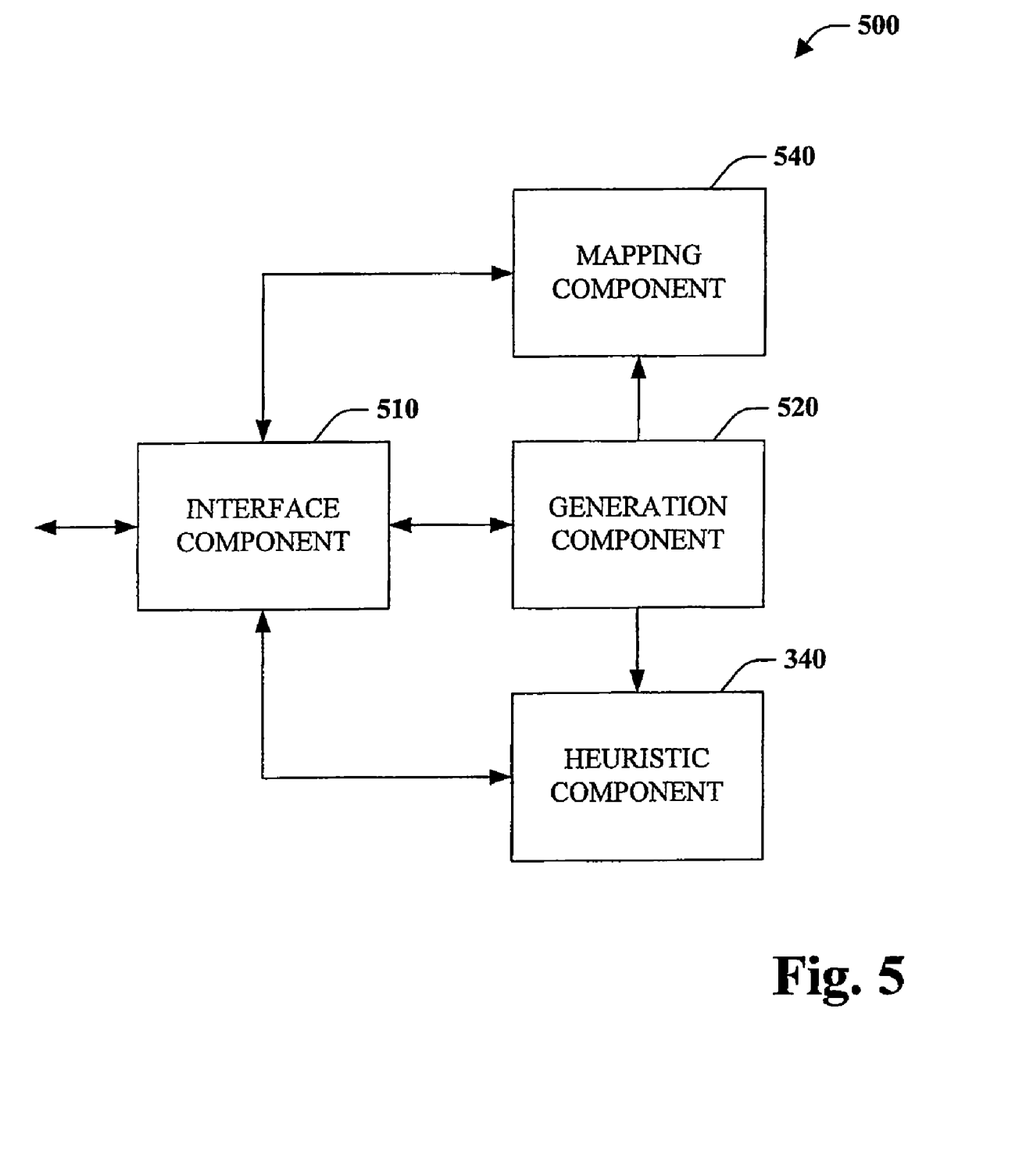
FIG. 5 is a block diagram of a heuristic component design system.

FIG. 5 depicts a heuristic component generation/design system 500 in accordance with an aspect of the subject innovation. The system 500 includes an interface component 510. The interface component 510 can request and receive/retrieve data from one or more entities. For instance, the interface component 510 can correspond to a graphical user interface (GUI) whereby a user provides information proactively or in response to a request therefor. In one exemplary scenario, the interface component 510 can correspond to a wizard that asks series of questions in a sequential manner. However, the subject innovation is not limited thereto.

The interface component 510 is communicatively coupled to a generation component 520. The based on data or information provided via the interface component 510, the generation component 520 can produce a heuristic component 340. Additionally or alternatively, a mapping or schema component 540 can be produced by generation component 520. As described supra, a heuristic component 340 can employ a mapping or schema to facilitate resolution of metadata conflicts or mismatches. Once a heuristic component 340 and/or mapping component 540 are generated they can be made available for employment, for instance by a connector component.

In addition to or in the alternative, it should be appreciated that the system 500 can also enable modification of heuristic and mapping components. As illustrated, the interface component 510 can also be communicatively coupled to both the heuristic component 340 and the mapping component 540. Changes can be specified via interface component 510 and communicated to the generation component 520. The generation component 520 can then amend particular components or generate new components with the changes incorporated therein.

Figure 6:
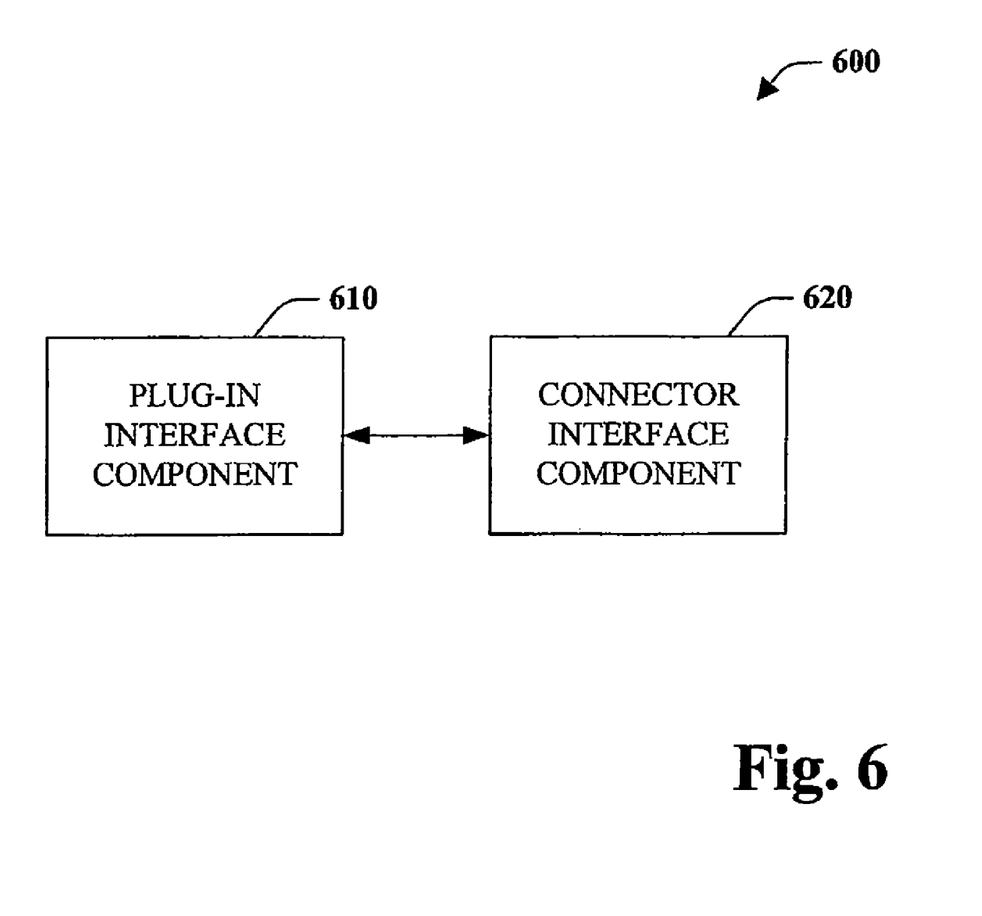
FIG. 6 is a block diagram of an interface system.

FIG. 6 illustrates an interface system 600 in accordance with an aspect of the provided innovation. It should be appreciated that while heuristic components can be built in or generated within a system, third party or non-native heuristic components can also be received and employed thereby providing system extensibility. The interface system 600 can correspond to but is not limited to an application programming interface (API) for receiving non-native heuristic and/or related components. The system 600 includes a plug-in interface component 610 communicatively coupled to a connector interface component 620. The plug-in interface component 610 provides a mechanism to receive or retrieve a non-native heuristic component. The connector interface component 620 can receive or retrieve a non-native heuristic component from the plug-in component 610 and make it available for use by a connector component. To facilitate communication between interface components 610 and 620 each interface may be required to implement particular mechanisms, functions or methods that can be called or executed by the other component. Once a non-native heuristic component and/or other related components such as mappings or schemas are received and made available, they can be employed just as built-in or native heuristic components. For example, a non-native heuristic component can appear in a drop down menu for selection by a user in relation to one or more connector components.

As an example of third party heuristic use assume a connector initial employs two heuristic such as straight across and name matching. Also, assume that it turns out that many flat files are being read, where flat files are all text. However, there is a large quantity of text in flat files that are really numbers, but they are represented as text. Hence, a new heuristic could be generated that takes text that is know to actually be a number and maps that string column to an integer column in a table. Once this heuristic is developed, it can be provided to a pipeline system for consumption by a connector component.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Furthermore, as will be appreciated, various portions of the disclosed systems above and methods below may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the reasoning component 420 can employs such mechanisms with respect to automatically resolving metadata mismatches.

Figure 7:
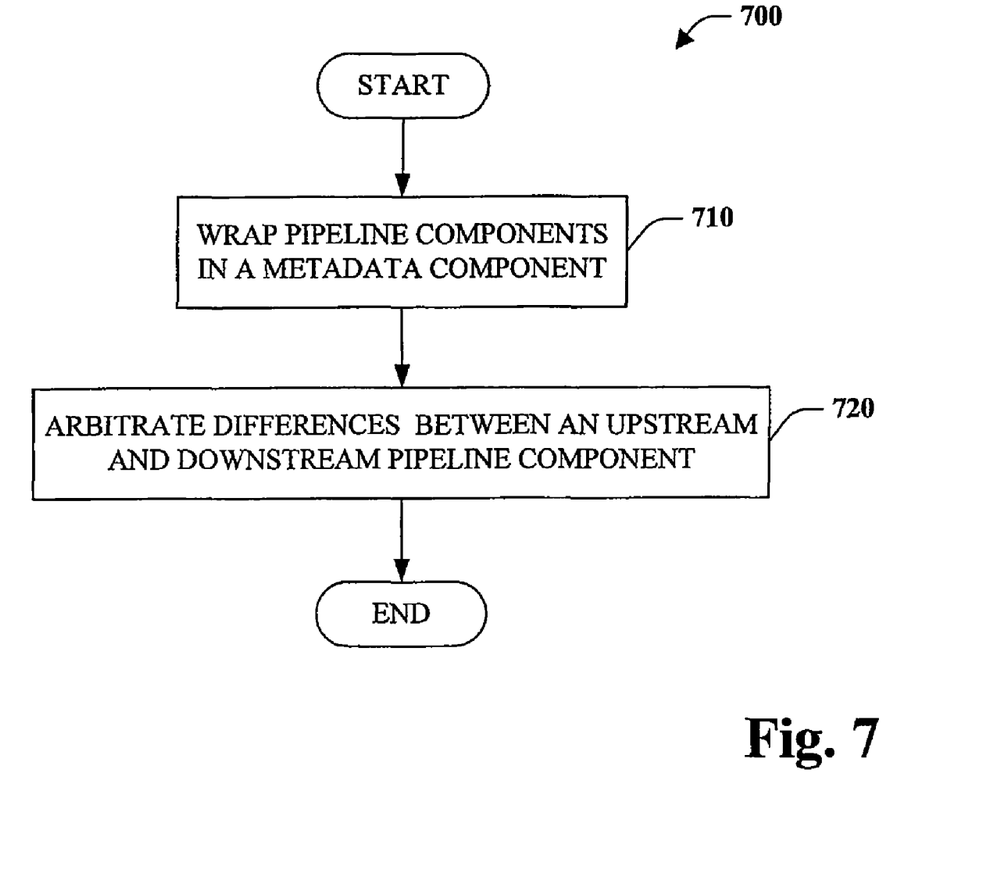
FIG. 7 is a flow chart diagram of a pipeline interaction methodology.
Figure 8:
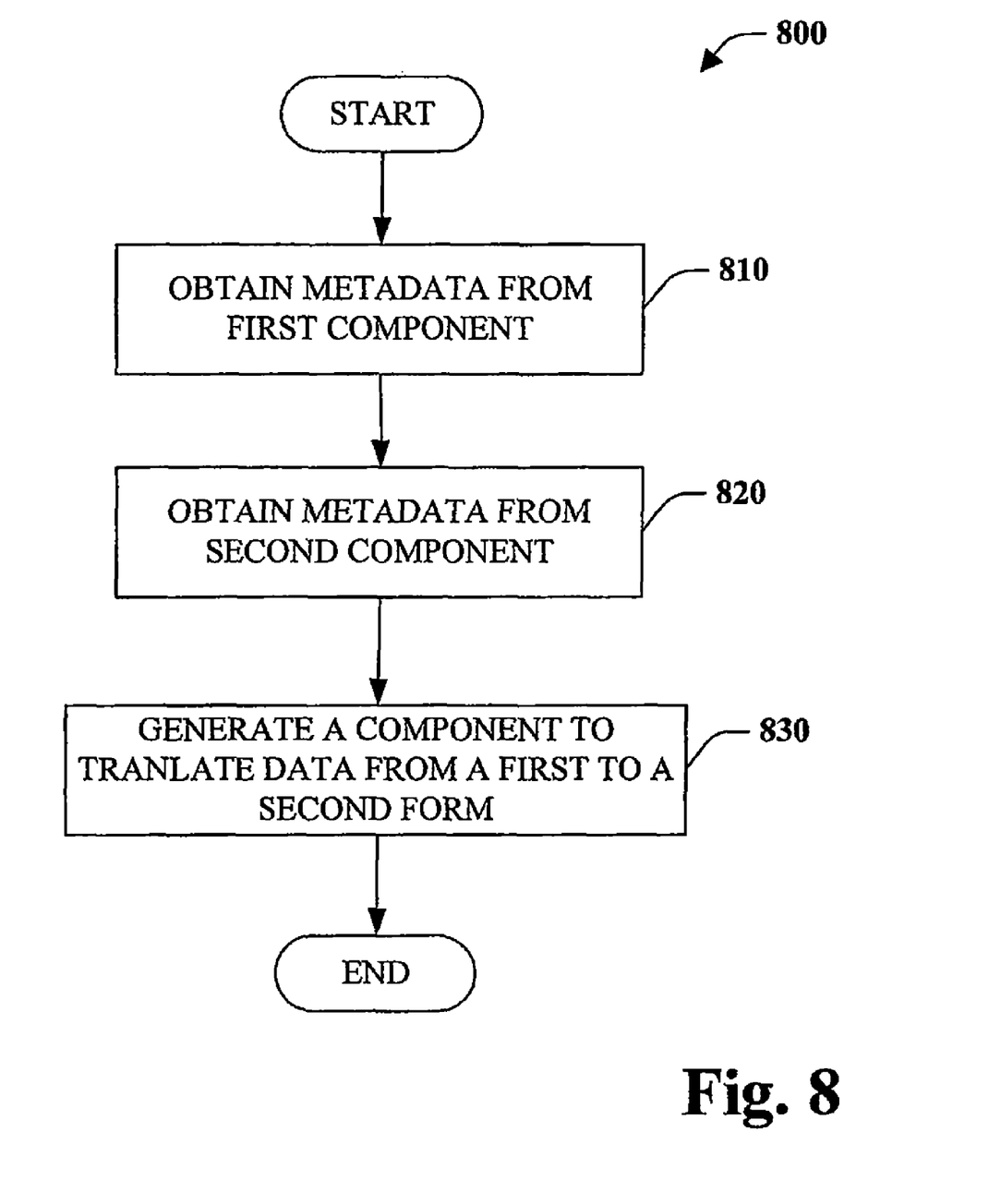
FIG. 8 is a flow chart diagram of a method of pipeline component composition.
Figure 9:
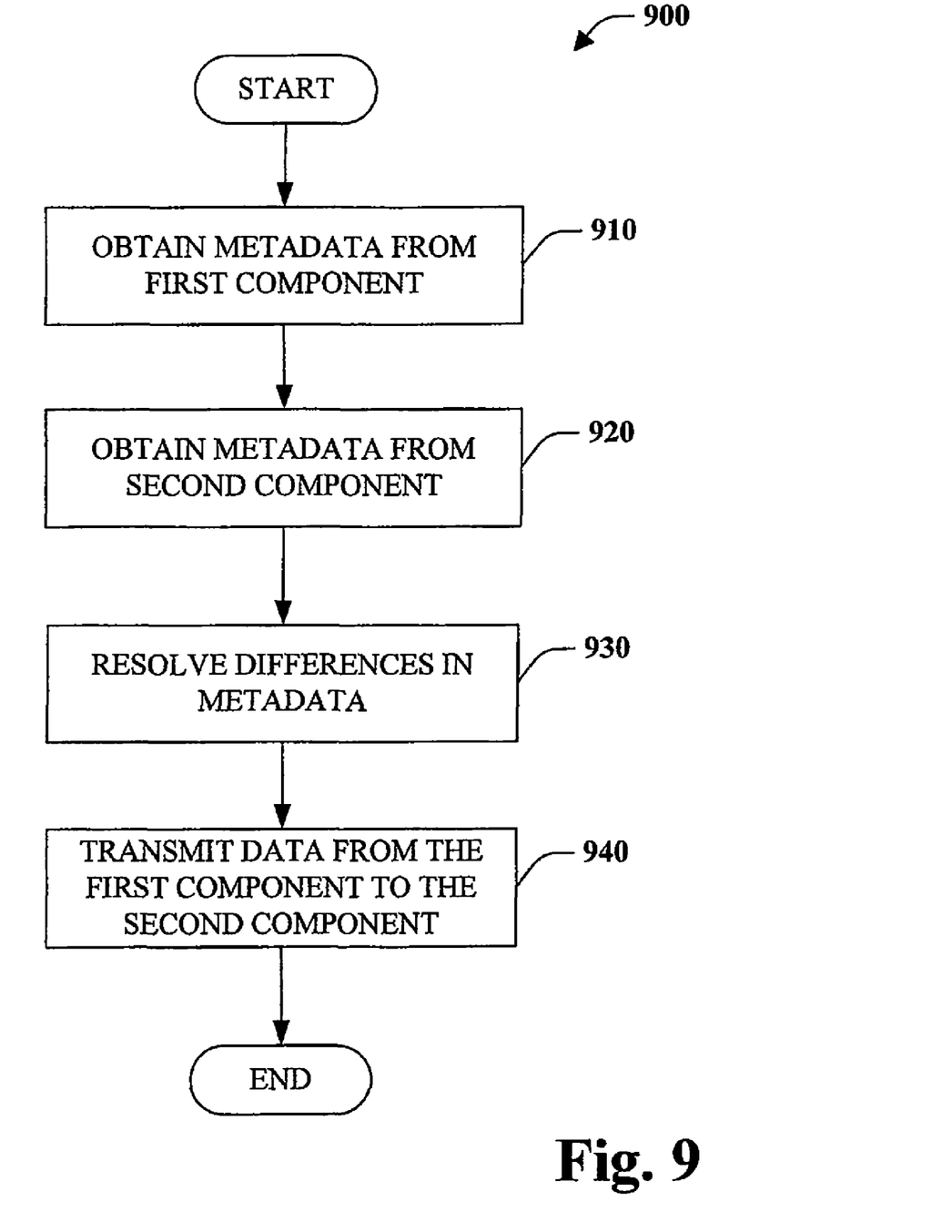
FIG. 9 is a flow chart diagram of a method of data connectivity.

In view of the exemplary systems described supra, methodologies that may be implemented in accordance with the disclosed subject matter will be better appreciated with reference to the flow charts of FIGS. 7-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning to FIG. 7, a pipeline interaction methodology is depicted in accordance with an aspect of the subject invention. At reference numeral 710, pipeline components are wrapped in metadata components. Stated differently, the metadata associated with a component is abstracted or made visible to other components. This creates a separation between a pipeline component and the rest of the pipeline. At reference numeral 720, metadata differences are arbitrated between upstream and downstream pipeline components. More specifically, the arbitration process can resolve mismatches in metadata. Accordingly, metadata is isolated from components in such a way that the component only sees a specific look of the metadata. These pieces of metadata can be altered such that if metadata changes between one component and another, the connector will allow the break to be hidden rather than having components downstream break.

FIG. 8 depicts a method of pipeline composition 800 in accordance with an aspect of the subject innovation. At reference numeral 810, metadata is obtained from a first pipeline component. Metadata is acquired from a second pipeline component at 820. At reference numeral 830, a component is generated that links the first and second component and also translates data from a first form to a second form. Method 800 can be performed manually by a user for example within an integrated development environment or automatically perhaps utilizing artificial intelligence base technologies. Further yet, the functionality for translating data can be designed outside the system and plugged-in, as the system is extensible in at least this manner.

FIG. 9 illustrates a method 900 of data connectivity in accordance with the subject innovation. At reference numeral 910, metadata is obtained from a first component. Metadata is obtained from a second component at reference 920. At numeral 930, differences in metadata are resolved. One or more heuristics such as but not limited to pass through, connect like names, connect like type and connect like names and types can be applied to arbitrate the differences. More complicated heuristics can also be created and/or provided by third parties.

As an example of a connect like names heuristic, assume a pipeline component is initially set up to process data in the form first name, last name and age, and this is later changed to age, first name, last name. There is a disconnect based on order. However, this can be resolved by matching like names here the old and new ages and other data and reordering the data.

At reference number 940, data such as arbitrated data is transmitted from the first to the second component. In the above example, the reordered data would be transmitted from the first to second component thereby preventing a break.

Figure 10:
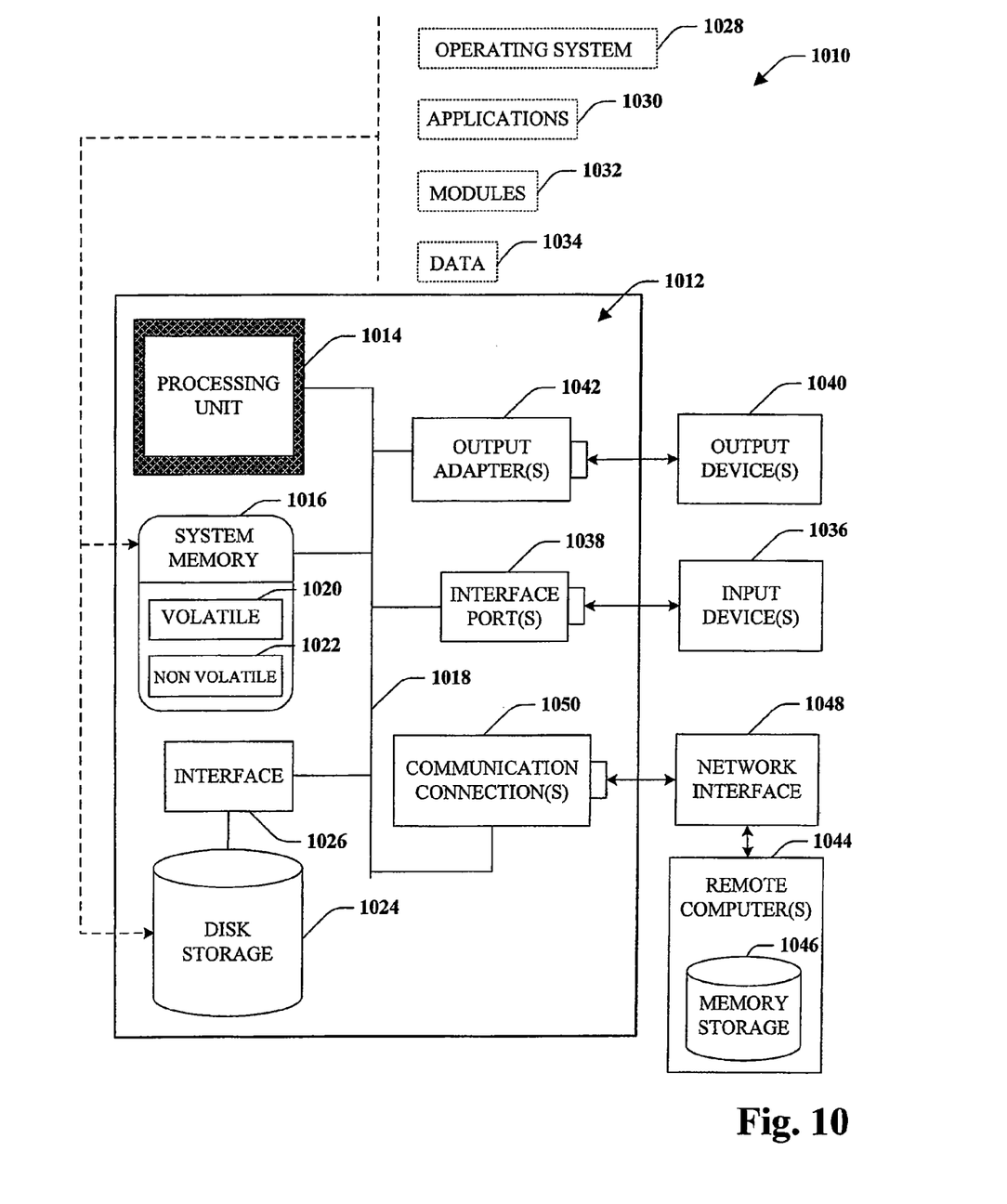
FIG. 10 is a schematic block diagram illustrating a suitable operating environment for aspects of the subject innovation.
Figure 11:
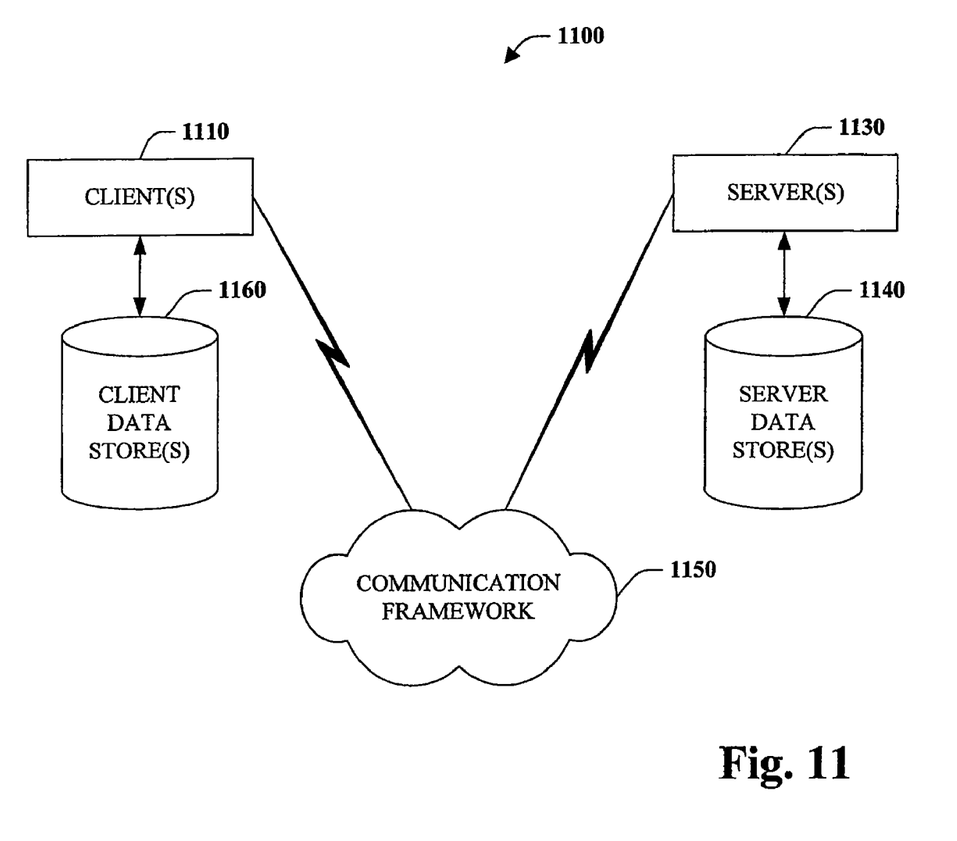
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 10, an exemplary environment 1010 for implementing various aspects disclosed herein includes a computer 1012 (e.g., desktop, laptop, server, hand held, programmable consumer or industrial electronics . . . ). The computer 1012 includes a processing unit 1014, a system memory 1016, and a system bus 1018. The system bus 1018 couples system components including, but not limited to, the system memory 1016 to the processing unit 1014. The processing unit 1014 can be any of various available microprocessors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012 and to output information from computer 1012 to an output device 1040. Output adapter 1042 is provided to illustrate that there are some output devices 1040 like displays (e.g., flat panel and CRT), speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1016, it can also be external to computer 1012. The hardware/software necessary for connection to the network interface 1048 includes, for exemplary purposes only, internal and external technologies such as, modems including regular telephone grade modems, cable modems, power modems and DSL modems, ISDN adapters, and Ethernet cards or components.

FIG. 11 is a schematic block diagram of a sample-computing environment 1100 with which the subject innovation can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing the subject innovation, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. The client(s) 1110 are operatively connected to one or more client data store(s) 1160 that can be employed to store information local to the client(s) 1110. Similarly, the server(s) 1130 are operatively connected to one or more server data store(s) 1140 that can be employed to store information local to the servers 1130.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A computer program product for a pipeline system comprising one or more computer-readable storage media having encoded thereon computer executable instructions which, when executed upon one or more computer processors, provide a plurality of computer components, the components comprising:
   a plurality of metadata components;
   a reference component, the reference component identifying reference data which is used in resolving metadata differences; and
   a connector component, the connector component comprising three subcomponents, the three subcomponents consisting of (i) a receiver component, (ii) an execution component, (iii) and a transmission component,
      the receiver component acquiring data and metadata from a first metadata component of the plurality of metadata components and providing the acquired data and metadata to the execution component for processing,
      the execution component being communicatively coupled to one or more heuristic components, the one or more heuristic components providing functionality for resolving metadata mismatches,
      the transmission component receiving arbitrated data from the execution component for transmission to a downstream component,
      the connector component analyzing metadata associated with at least two metadata components of the plurality of metadata components, and
      the connector component arbitrating metadata differences between the at least two metadata components by manipulation of the metadata associated with a first metadata component based at least in part on the execution component resolving metadata mismatches such that the metadata associated with the first metadata component is compatible with a schema associated with the at least one other metadata component,
      the execution component providing arbitrated data to the transmission component, and
      the transmission component transmitting the arbitrated data to a downstream metadata component.

2. The computer program product of claim 1, wherein at least one of the plurality of metadata components comprises at least one input metadata descriptor and at least one output metadata descriptor.

3. The computer program product of claim 1, wherein the execution component executes functionality provided by at least one of the one or more heuristic components.

4. The computer program product of claim 1, wherein the receiver component acquires an input descriptor from the downstream metadata component.

5. The computer program product of claim 3, further comprising an interface component to enable a user to modify a particular heuristic component.

6. The computer program product of claim 5, further comprising a generation component communicatively coupled to the interface component that facilitates producing a new heuristic component.

7. The computer program product of claim 5, further comprising one or more interface components to facilitate receipt of non-native or plug-in heuristic components.

8. The computer program product of claim 3, the at least one of the one or more heuristic components employs a file that contains reference data to facilitate transforming data from a first format or first schema associated with a first domain to a disparate format or disparate schema associated with a disparate domain.

9. The computer program product of claim 3, wherein the at least one of the one or more heuristic components:
- analyzes at least one of data or metadata associated with the first metadata component and the downstream metadata component,
- infers one or more types of data respectively associated with the first metadata component and the downstream metadata component based at least in part on the analysis of the at least one of data or metadata, and
- automatically determines a mapping between the first metadata component and the downstream metadata component that is utilized to facilitate arbitration of metadata differences between the first metadata component and the downstream metadata component.

10. A computer-implemented method for a pipeline system, the method comprising executing computer-executable instructions upon one or more computer processors, the computer-executable instructions, when executed upon the one or more computer processors, providing a plurality of computer components, the components comprising:
- a plurality of metadata components;
- a reference component, the reference component identifying reference data which is used in resolving metadata differences; and
- a connector component, the connector component comprising three subcomponents, the three subcomponents consisting of (i) a receiver component, (ii) an execution component, (iii) and a transmission component,
  - the receiver component acquiring data and metadata from a first metadata component of the plurality of metadata components and providing the acquired data and metadata to the execution component for processing,
  - the execution component being communicatively coupled to one or more heuristic components, the one or more heuristic components providing functionality for resolving metadata mismatches,
  - the transmission component receiving arbitrated data from the execution component for transmission to a downstream component,
  - the connector component analyzing metadata associated with at least two metadata components of the plurality of metadata components, and
  - the connector component arbitrating metadata differences between the at least two metadata components by manipulation of the metadata associated with a first metadata component based at least in part on the execution component resolving metadata mismatches such that the metadata associated with the first metadata component is compatible with a schema associated with the at least one other metadata component,
  - the execution component providing arbitrated data to the transmission component, and
  - the transmission component transmitting the arbitrated data to a downstream metadata component.

11. The method of claim 10, wherein at least one of the plurality of metadata components comprises at least one input metadata descriptor and at least one output metadata descriptor.

12. The method of claim 10, wherein the execution component executes functionality provided by at least one of the one or more heuristic components.

13. The method of claim 10, wherein the receiver component acquires an input descriptor from the downstream metadata component.

14. The method of claim 12, further comprising an interface component to enable a user to modify a particular heuristic component.

15. The method of claim 14, further comprising a generation component communicatively coupled to the interface component that facilitates producing a new heuristic component.

16. The method of claim 14, further comprising one or more interface components to facilitate receipt of non-native or plug-in heuristic components.

17. The method of claim 12, the at least one of the one or more heuristic components employs a file that contains reference data to facilitate transforming data from a first format or first schema associated with a first domain to a disparate format or disparate schema associated with a disparate domain.

18. The method of claim 12, wherein the at least one of the one or more heuristic components:
- analyzes at least one of data or metadata associated with the first metadata component and the downstream metadata component,
- infers one or more types of data respectively associated with the first metadata component and the downstream metadata component based at least in part on the analysis of the at least one of data or metadata, and
- automatically determines a mapping between the first metadata component and the downstream metadata component that is utilized to facilitate arbitration of metadata differences between the first metadata component and the downstream metadata component.

\* \* \* \* \*